Dec. 23, 1941.  A. M. WOLF  2,267,389
BRAKE OPERATING MECHANISM
Original Filed April 15, 1933
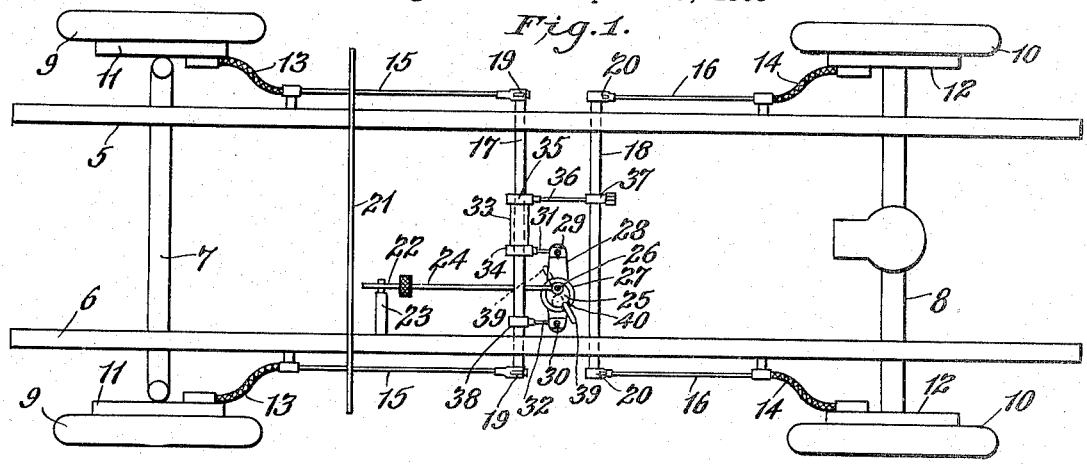
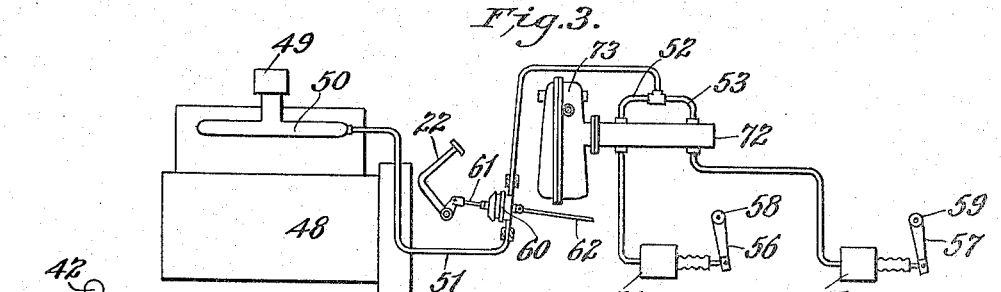
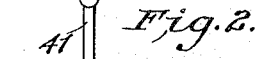
 
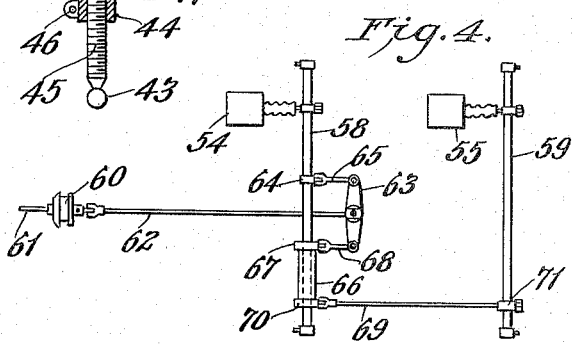
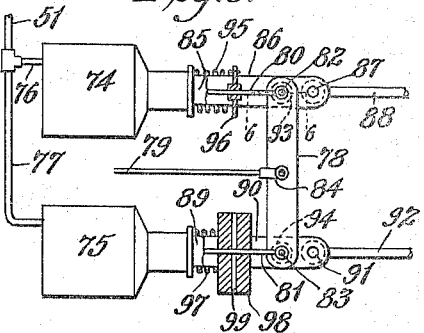
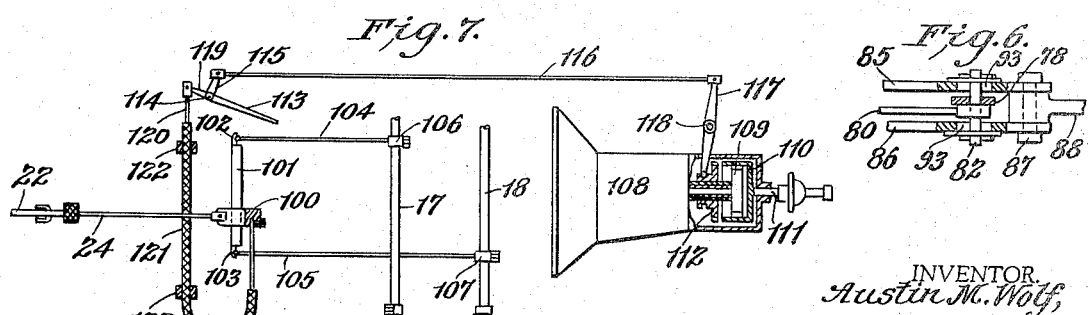
INVENTOR.
Austin M. Wolf,
BY M. C. Lyddane
ATTORNEY.

Patented Dec. 23, 1941

2,267,389

UNITED STATES PATENT OFFICE 2,267,389

BRAKE OPERATING MECHANISM

Austin M. Wolf, Plainfield, N. J.

Original application April 15, 1933, Serial No. 666,332. Divided and this application November 27, 1939, Serial No. 306,300

3 Claims. (Cl. 188—204)

This invention relates to brake operating mechanism, the subject matter of the present application constituting a division of my pending application for patent, Ser. No. 666,332, filed April 15, 1933, now Patent No. 2,181,161, November 28, 1939.

The invention more particularly relates to the operation and control of four wheel brakes for motor vehicles, and has for its general object and purpose to provide simple and efficiently operating means for effecting a desired proportional distribution of the braking effort between the front and rear pairs of wheel brake mechanisms.

It is another object of the invention in one embodiment thereof to provide brake actuating mechanism between an operator's brake pedal and the front and rear pairs of wheel brakes which includes an adjustable equalizer through the medium of which a greater proportion of the braking pressure may be applied to the front wheels than to the rear wheels of the vehicle.

I also propose to combine the mechanically controlled means for proportionally distributing the braking effort to the front and rear brake mechanisms with a vacuum or fluid control braking system in which the proportional distribution of the braking pressures is automatically varied by means of an inertia responsive device as disclosed in my pending application.

In a further embodiment of the invention, the brake pressure proportioning means is combined with a free wheeling device whereby when the vehicle motor is disconnected from the rear driving axle, proportionally greater pressure is applied to the braking mechanisms of the rear vehicle wheels.

With the above and other objects in view, the invention consists in the improved brake operating mechanism and in the form, construction and relative arrangement of its several parts as will hereinafter be more fully described, illustrated in the accompanying drawing and subsequently incorporated in the subjoined claims.

In the drawing wherein I have illustrated several simple and practical embodiments of the invention and in which similar reference characters designate corresponding parts throughout the several views:

Fig. 1 is a plan view of a motor vehicle frame or chassis showing manually controlled means for variably distributing the braking effort to the front and rear wheel brake mechanisms.

Fig. 2 is a detail horizontal section illustrating a modified form of the adjustable equalizer.

Fig. 3 is a semi-diagrammatic side elevation illustrating an embodiment of the invention as applied to a vacuum booster braking system.

Fig. 4 is a plan view of the latter form of the invention.

Fig. 5 is a plan view showing another modified form of the device applied to a different type of brake operating system.

Fig. 6 is a detail vertical section taken substantially on the line 6—6 of Fig. 5, and Fig. 7 is a plan view illustrating the combination of the proportional brake pressure distributing means with a free wheeling control device for the motor vehicle.

Referring in detail to the drawing, and for the present more particularly to Fig. 1 thereof, 5 and 6 respectively designate the longitudinal side rails of a motor vehicle frame or chassis, 7 the front axle and 8 the rear axle, said axles being provided with the usual front and rear wheels 9 and 10 respectively. These wheels carry the brake drums indicated at 11 and 12 within which the braking mechanisms (not shown), of conventional type are mounted. The braking mechanisms may be either mechanically or fluid actuated, in accordance with common practice. In the particular application shown in Fig. 1, of the mechanical type, the brake mechanisms are actuated by the flexible connections 13 and 14 respectively to which power is transmitted through the rods 15 and 16 respectively from the front and rear brake shafts 17 and 18 which are suitably mounted at their opposite ends for oscillatory rotation upon the vehicle frame. It will be understood that the rear ends of the rods 15 are pivotally connected with upstanding arms 19 on the ends of the front brake shaft 17 while the rods 16 are similarly connected with the downwardly extending arms 20 at the ends of the rear brake shaft 18.

At the rear of the vehicle dash indicated at 21, the usual operator's brake pedal 22 is mounted upon a suitable supporting bracket 23 on the side rail 6 of the vehicle frame. A rod 24 is pivotally connected at its forward end with the lower end of said brake pedal so that in the depression of said pedal, the rod will be moved forwardly. The rear end of this rod has an eccentric pivotal connection 26 with a rotatably mounted trunnion 25 in an off-center boss 27 on the equalizer bar 28. In the illustrated position, the connection 26 at the rear end of rod 24 is located substantially midway between the ends 29 and 30 of the equalizer bar. To these opposite ends of the equalizer bar, the links 31 and 32 respectively are pivotally connected at one of their ends. The other end of link 31 is similarly connected to an arm 34 on one end of a sleeve 33 which is loosely mounted on the front brake shaft 17 for oscillatory rotation relative thereto. The other end of this sleeve is also provided with an arm 35 connected by rod 36 with an arm 37 fixed to the rear brake shaft 18. The other of the links 32 is connected at its forward end to an arm 38 which is fixed to the front brake shaft 17.

In the relationship of the parts as shown in Fig. 1, it will be evident that when pressure is applied to the brake pedal 22, the effort exerted thereon is conveyed to the equalizer bar 28 and equally distributed to the front and rear brake operating shafts 17 and 18 so that an equal braking effort is distributed to the front and rear wheel brakes.

In order to differentially proportion the braking effort between the front and rear wheel brakes, means is provided for rotating the trunnion 25 so as to shift the point of connection of the rear end of rod 24 with the equalizer bar between the opposite ends thereof. One embodiment of this adjusting means may comprise a suitable lever 39 pivotally connected with the upper end of the trunnion 25. It is evident that when this lever is operated and moved to the position shown in dotted lines, the trunnion 25 will be rotated to position the connection 26 between said trunnion and rod 24 nearer to the end 30 of the equalizer bar than to the end 29 thereof thus transmitting a greater braking effort to the front brake applying shaft 17. The upper end of the hub or boss 27 on the equalizer bar may be provided with suitable notches as indicated at 40 in which the lever 39 has locking engagement to retain the trunnion 25 in its adjusted position. Of course, it is apparent that said lever can be actuated by suitable remote control connections with an operating element conveniently located with respect to the driver's seat.

For the purpose of effecting variation in the proportional distribution of braking effort in small increments, in Fig. 2 I show another form of the adjustable equalizer bar. In this case, said bar is in the form of a cylindrical rod 41 having suitably formed terminals 42 and 43 for connection with the links 31 and 32 respectively. Upon this rod 41, a sleeve 44 has threaded engagement upon the threaded section 45 of the rod 41. To the front side of this sleeve the rear end of the rod 24 is adapted to be pivotally connected at 46. A lever 47 is pinned or otherwise secured at one of its ends to the equalizer rod 41 and is adapted to be manually operated through suitable connections therewith to rotate said rod, and thus shift the sleeve 45 so as to move the connection 46 with rod 24 from the central position illustrated in the drawing to a position in closer proximity to the end 43 of the equalizer. The terminals 42 and 43 of rod 41 are of the spherical form shown which permits of this axial rotation of rod 41 relative to the connections 31 and 32.

While in Fig. 1 of the drawing I have shown a four wheeled vehicle, it will be understood that the above described mechanism for proportioning the braking effort between front and rear brakes may also be applied to a six or eight wheeled vehicle. Should two rear axles be used, brake shaft 18 will apply the initial braking effort on the rear braking mechanism, and brake shaft 17 would function in the same manner for a vehicle having multiple front axles. Further, it is apparent that independent suspension of the vehicle wheels will in no way affect the operation of the invention. I have shown the invention as applied to a road vehicle, but, with resort to obvious modifications, the operating principles thereof may also be applied to the braking systems of rail-borne vehicles.

In Figs. 3 and 4 of the drawing, I show an application of the invention in connection with a vacuum braking system. For purposes of illustration, I show the prime mover or internal combustion engine 48 provided with a down-draft carburetor 49 connected with the intake manifold 50. The vacuum line 51 from said manifold is divided into the two branches 52 and 53, respectively, and vacuum is conveyed from these branch lines to the booster brake cylinders 54 and 55 respectively, for the operation of levers 56 and 57 connected with the brake actuating shafts 58 and 59, respectively.

A control valve indicated at 60 is interposed in the vacuum line 51 and forms an operating connection between the rods 61 and 62 the former being connected with brake pedal 22, and the latter with the equalizer bar 63 shown in Fig. 4. This equalizer bar divides the effort applied by the operator's foot to pedal 22 between the arm 64 fixed to the front brake shaft 58 which is connected with one end of said arm by link 65, and the arm 67 on the inner end of sleeve 66 which is connected to the other end of the equalizer bar by link 68. Rod 69 connects arm 70 on the outer end of sleeve 66 with arm 71 fixed to the rear brake actuating shaft 59.

In Fig. 3 of the drawing, I have shown an automatic vacuum control means interposed in the branch lines 52 and 53. This means for controlling the vacuum supplied to cylinders 54 and 55 may be similar to that disclosed in my pending application above identified and comprises a slidable valve member within casing 72 having suitably formed ports therein to register with the pipe lines 52 and 53. One end of this slidable valve is connected with an inertia responsive pendulum mounted within the casing 73 so that in the initial application of the brakes and the resultant deceleration effect, in the responsive movement of said pendulum, the ports in the valve member will be relatively positioned with respect to the vacuum lines 52 and 53 so that a greater vacuum is produced in the front brake cylinder 54 than in the rear cylinder 55. Thus in proportion to the open areas of the respective valve ports in register with pipe lines 52 and 53 respectively, a proportionally greater braking effort will be applied to the front wheel brakes than to the rear brakes.

It will be readily seen that in the above construction, normally the proportional distribution of the braking effort upon the front and rear brakes will be automatically effected by the operation of the inertia responsive control valve. However, in the absence of a vacuum in the braking system, when the engine stalls or for other reasons is not operative, the manually applied pressure on brake pedal 22 will be equally distributed to the brake actuating shafts 58 and 59 by the mechanism illustrated in Fig. 4 of the drawing. However, this latter condition is exceptional and rarely occurs.

In Figs. 5 and 6 of the drawing I have illustrated an application of the inertia responsive means for proportionally increasing the braking effort on the front brakes in connection with a reactionary type of booster brake cylinder. The cylinders 74 and 75 are provided with the usual control valves, and are constructed and operate in the manner well known to those versed in this art. The pipes 76 and 77 respectively connect said cylinders with the vacuum line 51 which extends to the intake manifold of the engine.

The equalizer bar 78 is centrally connected by rod 79 with the conventional operator's brake pedal and actuates the valve control rods 80 and 81 respectively. Each of these rods is connected with one end of the equalizer bar by pins 82 and 83 respectively, equi-distantly spaced from the clevis connection 84 between said bar and the rod 79. The piston in cylinder 74 is connected with the vertically spaced bars 85 and 86 disposed in parallel relation respectively above and below the rod 80. These bars extend rearwardly of the equalizer bar 78 and are pivotally connected as at 87 with the brake actuating rod 88 which controls the application of the rear vehicle brakes.

Similar vertically spaced bars 89 and 90 are connected with and actuated by the piston in cylinder 75 and are connected at their rear ends as at 91 with the actuating rod 92 for the front vehicle brakes.

The pins 82 and 83 are movable relative to the pairs of bars 85, 86 and 89, 90 respectively, for which purpose each pair of bars is provided with openings 93 and 94 respectively of relatively large diameter. This clearance between said pins and the bars connected with the pistons in cylinders 74 and 75 permits movement of the valve rods 80 and 81 and the valves connected therewith upon initial movement of the equalizer bar 78. Air is thus admitted to the rear ends of cylinder 74 and 75, causing a forward movement of the bars 85, 86 and 89, 90 which transmit brake applying movement to the rods 88 and 92.

A spring 95 bearing against disk 96 on rod 80 yieldingly holds the valve of cylinder 74 in its normal position. The clearance openings 93 in the bars 85 and 86 permits movement of the brake cylinder piston in correspondence with the position of the foot on the operator's brake pedal to increase the pull on the brake rods, or to hold them stationary, depending upon whether the depression of the brake pedal is continued or said pedal held in a definite position.

A spring 97 also holds the valve of cylinder 75 in its normal position, said spring bearing against an inertia responsive mass 98 fixed to the valve rod 81 by pin 99. This mass moves freely along the bars 89 and 90, except as restrained by the spring 97. Under the influence of inertia, such as occurs in braking the vehicle, the mass 98 will slide forwardly, thus actuating the valve of cylinder 75 to admit fluid pressure to said cylinder so that the said cylinder through the connections with rod 92 will, due to the influence of inertia, produce a greater braking effort on the front brakes of the vehicle than that which is produced upon the rear brakes by cylinder 74.

The usual method of braking a motor vehicle consists in utilizing the engine braking effort by not declutching until the vehicle has reached a very low rate of speed. However, with the use of "free wheeling," in the operation thereof the driving power developed by the engine is not transmitted to the rear driving axle so that the braking effort of the engine on the rear vehicle wheels is not available. Accordingly, it is apparent that there is a material difference between the proportional distribution of the braking effort to the front and rear wheels when the braking effort of the engine is available, than when it is not available in the use of free wheeling. Therefore, any fixed ratio in the distribution of braking effort under all operating conditions between the front and rear wheel brakes becomes impossible.

In Fig. 7 of the drawing I have shown an application of the present invention which operates to increase the braking effort on the rear wheels when free wheeling is in use in approximate proportion to the braking effort of the engine when the free wheeling unit is locked out of operation. As shown, the operator's brake pedal 22 is connected by rod 24 with a block 100 which is axially shiftable along the equalizer bar 101. The ends 102 and 103 of this bar are connected respectively by rods 104 and 105 with the arms 106 and 107 on the front and rear brake shafts 17 and 18 respectively. In the position shown in the drawing, the block or member 100 is nearer the end 103 than the end 102 of the equalizer bar 101. Accordingly, a greater braking effort will be transmitted through rod 105 to the rear brake shaft 18 to compensate for inaction of the engine during the free wheeling.

At the rear end of the power transmission unit 108, the free wheeling cam 109 drives the member 110 on the universal joint shaft 111 which is connected by the usual propeller shaft with the differential drive of the rear wheel axle. A slidable member 112 has means for locking engagement with the member 110 so as to connect the latter through the transmission with the power shaft of the engine when free wheeling is not desired. In the disengaged position shown in the drawing, the free wheeling action is in use. In order to lock out the free wheeling unit, the operator moves lever 113 in a counter-clockwise direction to rock shaft 114 having an arm 115 connected by rod 116 with one end of the lever 117. This lever is fulcrumed intermediate of its ends at 118 and the other end thereof is operatively connected with member 112 whereby said member is shifted into clutching engagement with the member 110.

A second arm 119 on rock shaft 114 is connected to the flexible cable 120 movable through a suitable guide casing 121 mounted in spaced supports indicated at 122 and connected at its other end to the slidable block 100. Thus it will be evident that when member 112 is clutched to the member 110 and free wheeling is not in use, the block 100 is simultaneously shifted towards the center of the equalizer bar 101 by the operation of lever 113, thereby reducing the braking effort applied to the rear vehicle wheels through the operation of the pedal 22.

From the foregoing description considered in connection with the accompanying drawing, the construction, manner of operation and several advantages of the described embodiments of the invention will be clearly understood. It will be seen that I have provided in a very simple mechanical construction, a brake operating mechanism which is capable of practical application to meet different conditions which may arise in the operation of the vehicle and which includes means for distributing the braking effort to the front and rear wheel brakes in proper relative proportions to most efficiently, quickly and safely effect deceleration of the vehicle speed and bring the vehicle to a stop. Of course, the examples of the adjustable equalizer and actuating means therefor which I have above described, are largely suggestive, and other alternatives therefor will suggest themselves to one versed in the art. It is accordingly to be understood that while I have herein disclosed a number of simple and practical applications of my present improvements, the essential features thereof may also be exemplified in various other structural forms and relative arrangement and combination of the several cooperating elements. Therefore, the privilege is reserved of resorting to all such legitimate modifications in the above respects as may fairly be considered to be within the spirit and scope of the appended claims.

I claim:

1. Vehicle brake operating mechanism, comprising spaced brake applying members operatively connected with front and rear brakes respectively, operator controlled means for actuating said members including an equalizer bar, a rotatable member mounted on the equalizer bar, a brake pedal, an operating member connected at one end to said pedal and having its other end eccentrically connected to said rotatable member, connecting means between the opposite ends of said bar and the respective brake applying members, and means for actuating said rotatable member to position the connection with said operating member relative to the ends of the equalizer bar and variably proportion the distribution of braking effort to the front and rear brakes.

2. In vehicle brake operating mechanism, front and rear brake actuating shafts, an equalizer bar, operating connections between the opposite ends of said bar and the respective brake operating shafts, a manually operable brake applying member, and a member rotatably mounted on the equalizer bar with its axis perpendicular to the plane of said bar and eccentrically connected with one end of said brake applying member to position the latter relative to the ends of the equalizer bar and variably proportion the distribution of braking effort to the front and rear brakes.

3. In vehicle brake operating mechanism, front and rear brake actuating shafts, an equalizer bar, a relatively oscillatable sleeve mounted on the front brake actuating shaft, means operatively connecting one end of said sleeve with the rear brake actuating shaft, an actuating connection between one end of the equalizer bar and the other end of said sleeve, means operatively connecting the other end of the equalizer bar with the front brake actuating shaft, a member rotatably mounted on said equalizer bar intermediate of its ends, and a manually operable brake applying member operatively connected with said rotatable member by means acting to variably position said brake applying member between the ends of the equalizer bar upon rotation of said rotatable member to proportionately distribute the braking effort between the front and rear brakes.

AUSTIN M. WOLF.